United States Patent [19]

Thrlík

[11] Patent Number: 4,927,029

[45] Date of Patent: May 22, 1990

[54] DEVICE FOR CHECKING CYLINDRICAL BODIES, ESPECIALLY TUBES OF OPEN-END SPINNING MACHINES

[75] Inventor: Jirí Thrlík, Fzechoslovakian, Czechoslovakia

[73] Assignee: Elitex koncern textilniho strojirenstvi, Liberec, Czechoslovakia

[21] Appl. No.: 239,163

[22] Filed: Aug. 30, 1988

[30] Foreign Application Priority Data

Aug. 31, 1987 [CS] Czechoslovakia .................... 6330-87

[51] Int. Cl.$^5$ ............................ B07C 5/00; B07C 5/34
[52] U.S. Cl. .................................... 209/538; 209/520; 209/600; 209/927
[58] Field of Search ........................ 209/538, 600–602, 209/598, 517–521, 927; 242/35.5 A; 200/61.41, 61.42; 57/276, 281; 28/284

[56] References Cited

U.S. PATENT DOCUMENTS

| | | | |
|---|---|---|---|
| 1,309,086 | 7/1919 | Danner | 209/659 X |
| 3,021,949 | 2/1962 | Hogg et al. | 209/538 |
| 3,024,905 | 3/1962 | Caster et al. | 209/520 |
| 3,032,192 | 5/1962 | Uhlig | 209/538 |
| 3,570,668 | 3/1971 | Walk | 209/927 X |
| 4,681,230 | 7/1987 | Kupper | 209/927 X |
| 4,724,666 | 2/1988 | Kupper | 209/927 X |

FOREIGN PATENT DOCUMENTS

| | | |
|---|---|---|
| 232219 | 10/1982 | Czechoslovakia . |
| 234198 | 4/1983 | Czechoslovakia . |
| 2149573 | 4/1973 | Fed. Rep. of Germany ...... 209/927 |
| 631414 | 8/1982 | Switzerland . |

OTHER PUBLICATIONS

Operating manual for PEBSA-10N, published by Elitek, 1988.

*Primary Examiner*—Donald T. Hajec
*Attorney, Agent, or Firm*—Klein & Vibber

[57] ABSTRACT

A device for checking cylindrical bodies, especially the tubes of open-end spinning machines transported along a feed path from a tube container to the distribution mechanism of the tubes on the machine, for example, by means of a chain conveyor with feed blades and with a cyclical intermittent motion. The above includes an auxiliary container for discarded tubes situated over the tube container near the feed path of the feed blades and oriented with its inlet aperture towards the feed path. The arrangement includes a centering device mounted transversely with respect to the feed path of the tubes at the location where the blades of the chain conveyor are cyclically stopped. The centering device is disposed along the axis of the tube which is transported to it. The centering device is provided with a drive for imparting rotary motion to the centered tube. An inspection device is provided which comprises a pair of contact members which are operatively connected to feelers that are, together with a switch mounted at the end position of the centering device, connected with an actuating member arranged so as to shift the tubes identified as damaged out of the feed path and towards an inlet aperture of the auxiliary container provided for discarded tubes.

1 Claim, 4 Drawing Sheets

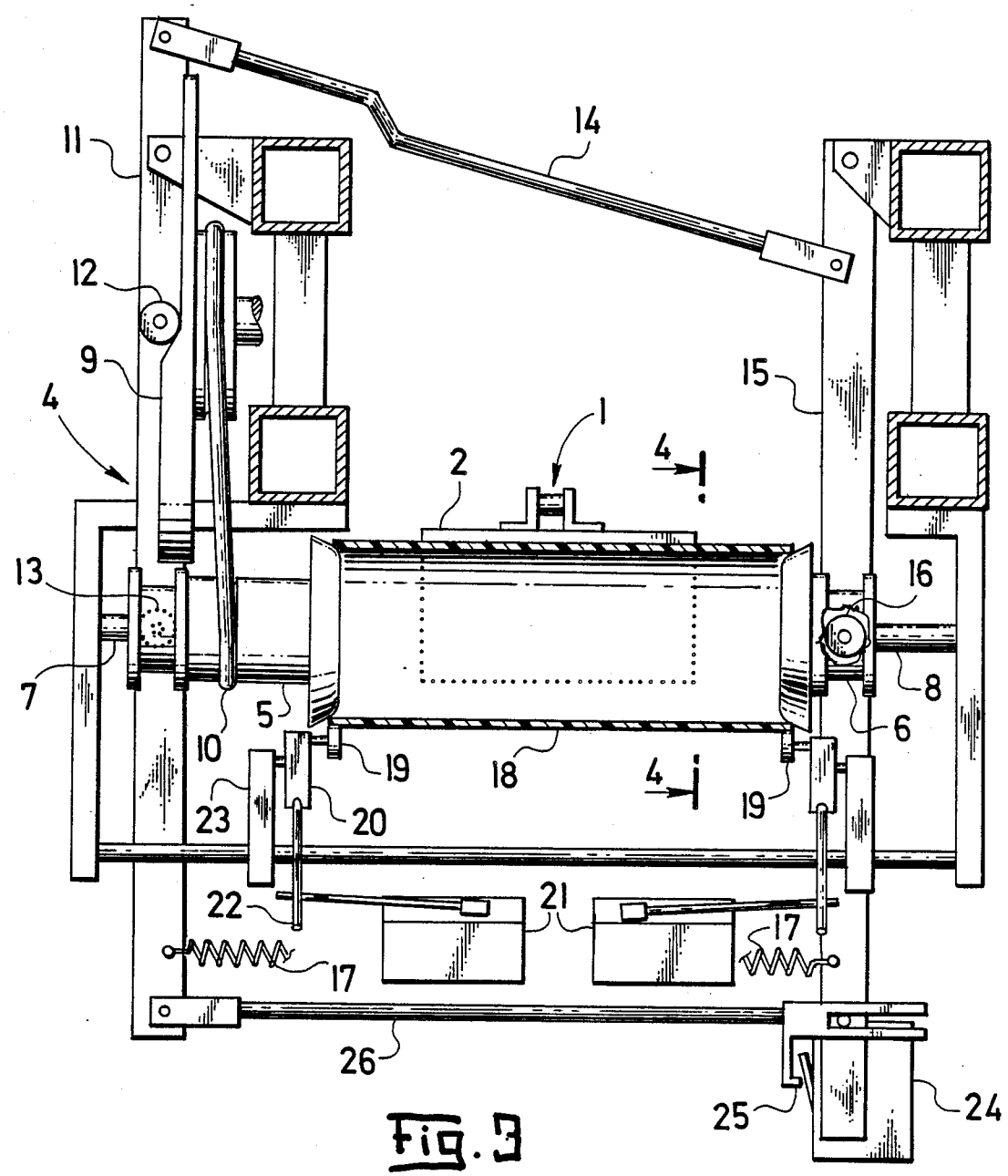
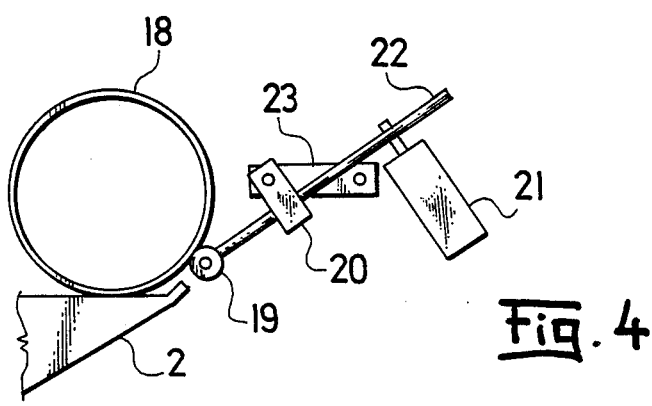

DEVICE FOR CHECKING CYLINDRICAL BODIES, ESPECIALLY TUBES OF OPEN-END SPINNING MACHINES

BACKGROUND OF THE INVENTION

The invention relates to a device for checking cylindrical bodies, especially the tubes of open-end spinning machines transported along a feed path from a tube container to the distribution mechanism of the tubes on the machine, e.g., by means of a chain conveyor with feed blades and with a cyclical intermittent motion, an auxiliary container intended to receive discarded tubes being provided over the tube container near the blade path and oriented with its inlet aperture towards the blade path.

The tubes are used for instance for winding on cross wound bobbins on open-end spinning machines. The empty tube must be brought to the automatic device designed to doff the bobbin and to insert the tube in its place. The Czechoslovak patent application No. 234,198 describes a device for continuous tube supply permitting the tubes to be freely fed into the container. It is highly probable that the operator will not inspect the tubes and discard the damaged ones, thus permitting tubes with malformed or broken out edges to get into the automatic device and thereby cause malfunctioning and time losses in the machine operation. The device described in the Czechoslovak patent application 232,219 discloses containers into which the tubes must be laid in definite position by the operator who, consequently, can check the tubes while inserting them into the containers; however, the inspection quality depends on the subjective evaluation of the operator.

The patent specification No. 34 14 680 of the German Federal Republic describes a device with a conveyor which receives a step-by-step motion and comprises an arm with a feeler for testing the state of the tubes and for discarding the damaged ones out of the process. This device, however, is unsuitable for testing the physical state of the tube edges, and to discard the damaged ones. The Swiss patent specification No. 631,414 describes the testing of conical tubes on the basis of an operation which is based on principles inapplicable to cylindrical tubes.

The purpose of this invention is to provide an arrangement in which an objective inspection of tubes is assured and which discards those with broken out or malformed edges. To achieve this purpose, a centering device of the tube is mounted in the arrangement along the tube axis transversely to the feed path of the tubes at the location of the intermittent motion stop interval. A drive for the centering device is provided to impart rotary motion to the centered tube. Contact members are provided at the circumference zones of the centered tubes, and govern the feelers which, together with a switch constitute an inspection means, and are interconnected with an actuating member arranged so as to shift the damaged tubes out of the feed path and towards the inlet aperture of an auxiliary container provided for damaged tubes.

The device according to the present invention is simple in design and requires only a limited space. Both the drive and measuring section are based on the classical principles of mechanics thus ensuring high operational reliability. Any subjective influence of the operator on the quality of testing is eliminated.

BRIEF DESCRIPTION OF THE DRAWING

Other advantages and features of the invention will be apparent from the attached drawings showing in which
FIG. 3 is a schematic plan view of the centering device;
FIG. 4 is a view of the contact member governing the feeler.

DETAILED DESCRIPTION

Figure 1:
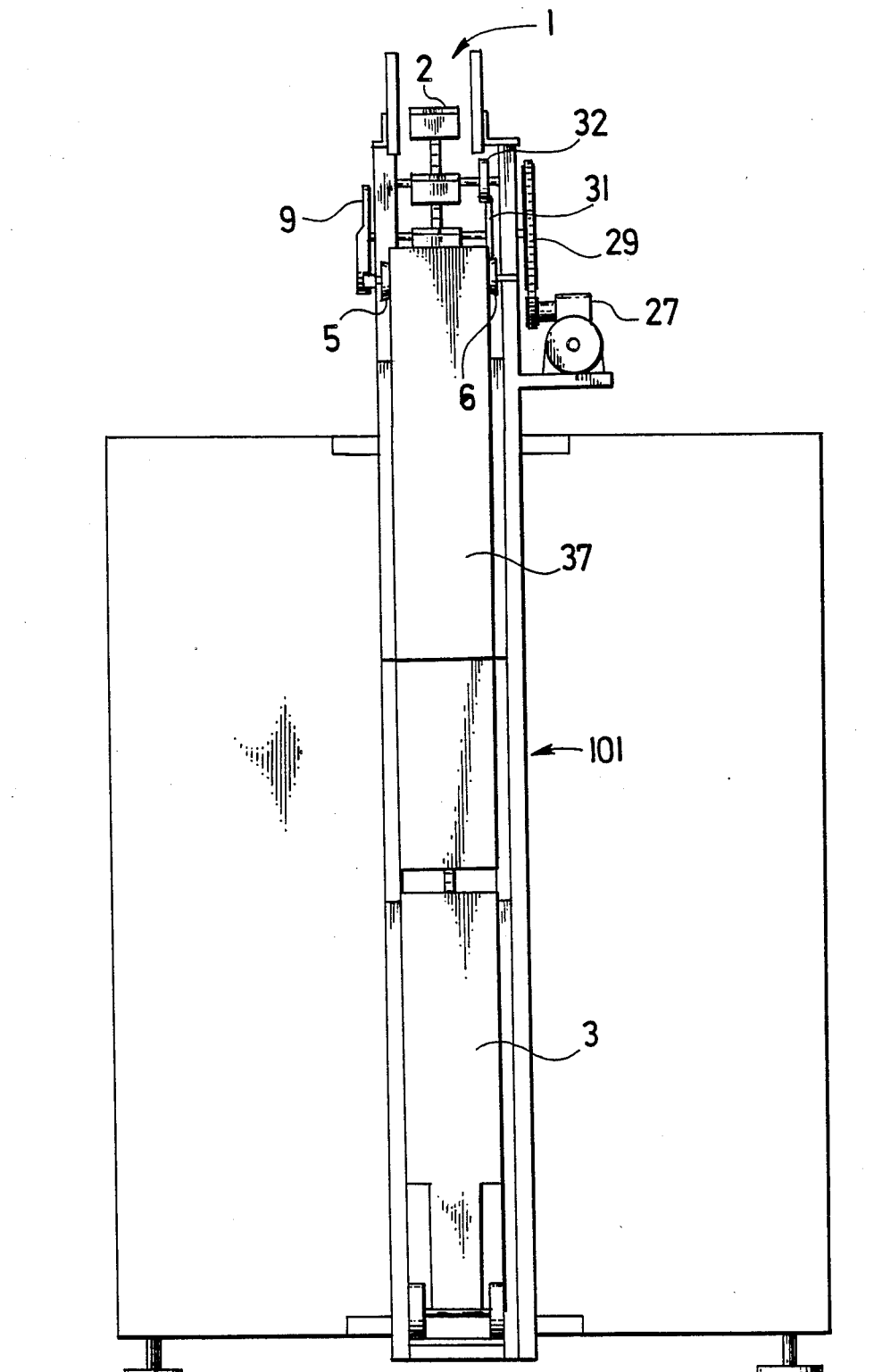
FIG. 1 is a schematic front view of the device.
Figure 2:
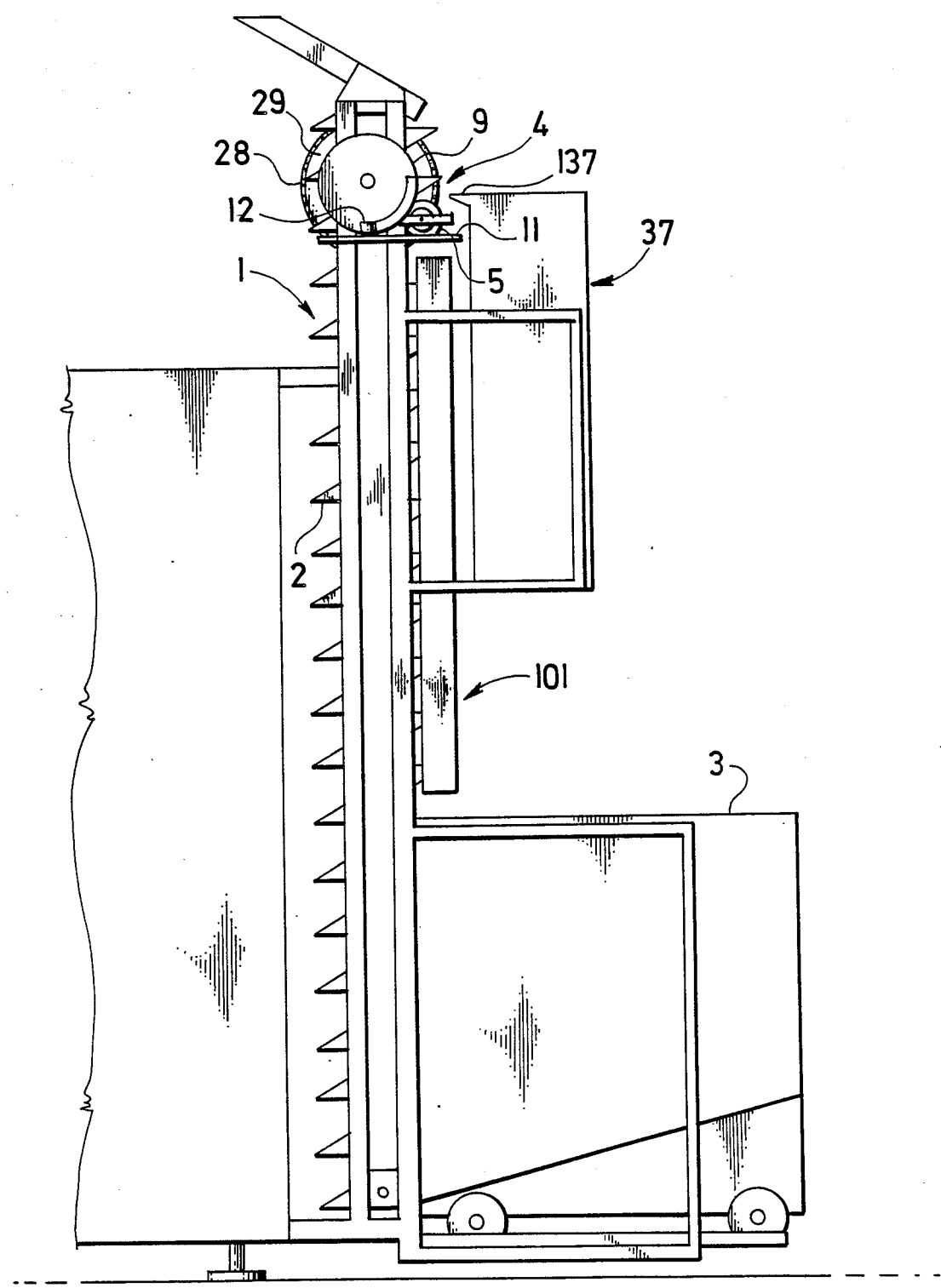
FIG. 2 is a schematic side view of the device.

As shown in FIGS. 1 and 2, the device comprises a vertically oriented chain conveyor 1 equipped with feed blades 2 adapted to carry a tube. A tube container 3 is situated so as to let the blades 2 of the chain conveyor 1 reach into it. The upper section of the chain conveyor 1 carries a centering device 4, see FIG. 3, consisting of a carrier 5 and support member 6, seated rotatably and transversably on the axes 7 and 8, respectively. The motion is imparted to the carrier 5 by a belt 10 from a cam 9 controlling also the opening mechanism comprising the left lever 11, whose roller 12 contacts the cam 9, and a roller 13 seated in a groove of the carrier 5. By means of the tie rod 14, the translational motion is transmitted to the right lever 15 whose roller 16 is seated in a groove of the support member 6.

The grip is achieved by means of the spring 17. A contact member 19, actuating via a balance beam 20 and the feeler 21 (see FIG. 4), rolls along the edge of the tube 18 to check it for possible broken-out sections. The balance beam 20 consists of an arm 22 rocking on a pin of a holder 23. The grip of the levers 11, 15, is checked by member 24 fixed to the right lever 15 and actuated by a contact member 25 connected with the left lever 11 by a tie rod 26.

Figure 5:
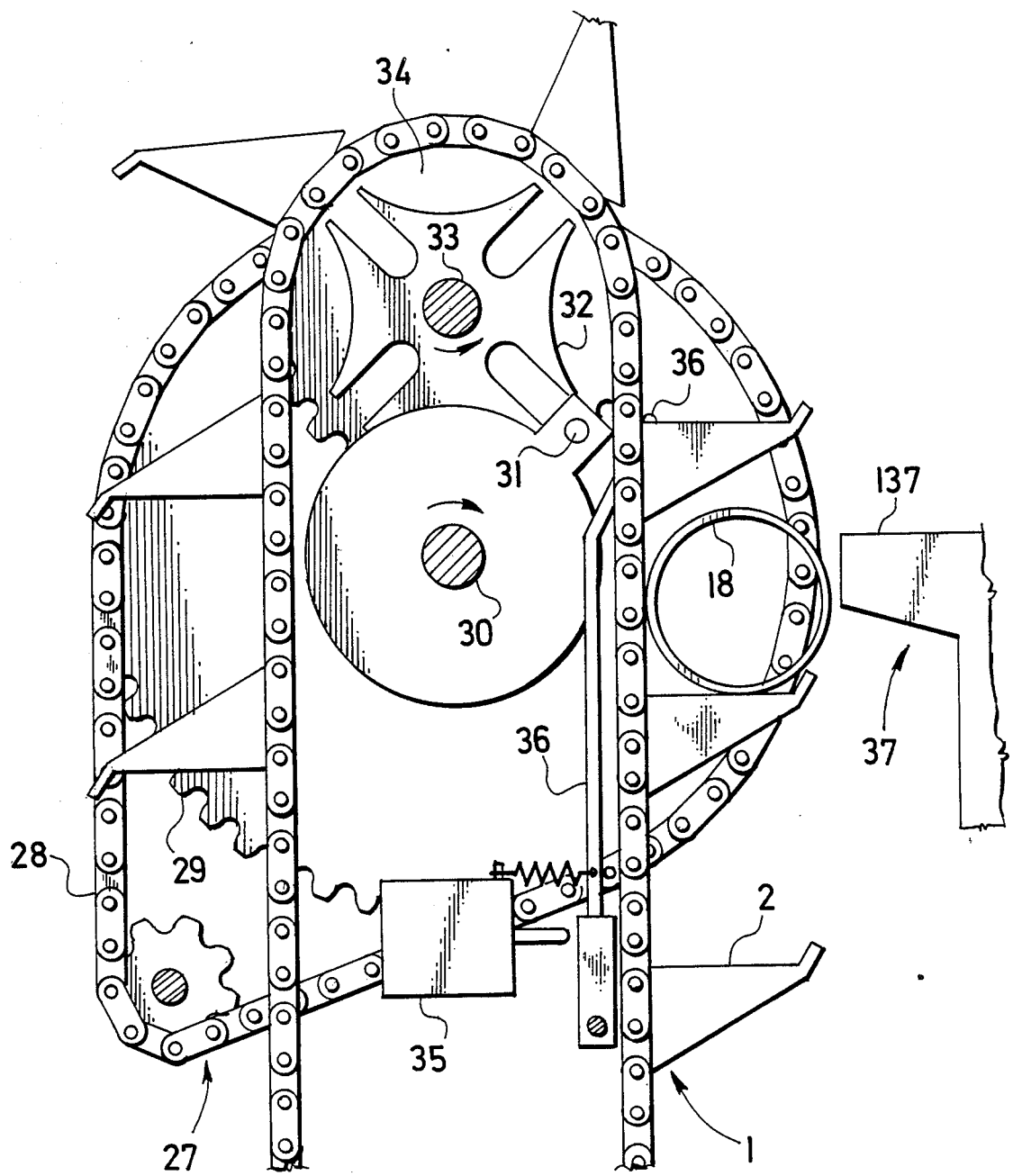
FIG. 5 a side view of the drive mechanism together with the actuating member intended to shift damaged tubes out of the feed path.

The drive of the chain conveyor 1 is shown in FIG. 5. An electric motor with a gear box 27 drives via a chain 28 a wheel 29 mounted on a shaft 30 together with a carrier 31 of a cross wheel and the cam 9; the cross wheel 32 is mounted on a common shaft 33 with the driving chain wheel 34 of the chain conveyor 1. Damaged tubes are removed by means of an actuating member 35 adapted to move arms 36 into the feed path of the tubes.

Manner of Operation

The described embodiment of the device, illustrated by way of example, operates as follows:

The tubes seated in the tube container 3 are fed by the feed blades 2 of the chain conveyor 1 to the centering device 4. Since the motion of the chain conveyor 1 is derived from the cross wheel 32, a fourth of the cycle is used for the feed proper, and three fourths, for measuring. The tube 18, held along the axis of the carrier 5 and of the support member 6, is gripped, centered, and then receives rotary motion, during which the contact members 19 of the balance beams 20 roll along the edge of the tube 18. In case a broken-out section of the tube edge is present, the feeler 21 is switched on. If due to malformation of the edge of the tube 18, the grip of the carrier 5 and of the support member 6 is not completed, the switch 24 will be switched on. The feelers 21 and the switch 24 are operatively connected with the actuating member 35 that is adapted to turn the arms 36 into the feed path of the tubes 18. During the next feed cycle, the damaged tubes 18 are removed from the feed path 101 to the inlet aperture 137 of the auxiliary container 37 of the discarded tubes 18.

While a specific embodiment of the invention has been shown and described in detail to illustrate the application of the principles of the invention, it will be understood that the invention may be embodied otherwise without departing from such principles.

I claim:

1. An apparatus for inspecting cylindrical tubes transported along a feed path from a tube supply container by means of a vertical chain conveyor having a plurality of uniformly spaced feed blades and driven by an intermittent cyclical drive means which advances each cylindrical tube in a stepwise manner through an operative cycle, the apparatus comprising said intermittent cyclical drive means comprising a maltese cross wheel whereby during one cycle in which said wheel is driven one complete revolution, said conveyor is stopped for ¾ of said cycle and moves for ¼ of said cycle;

an auxiliary container for receiving discarded tubes mounted above the tube supply container proximate to said cyclical drive means and adjacent to said feed path, said auxiliary container having an inlet aperture facing the feed path;

centering means mounted proximate said cyclical drive means and transversely to the feed path and arranged such that when said conveyor is stopped, said centering means is coaxial with respect to a tube on said conveyor;

driving means operatively connected to said centering means for imparting rotary motion to said tube;

an inspection means comprising contact means, feeler means, and switch means ; said centering means operable to center said tubes relative to said inspection means, said contact means contacting only opposite edges of a centered tube and operatively connected to said feeler means which is operatively connected to said switch means, whereby said opposite edges of said tube are inspected by said inspection means while said conveyor is stopped and said switch is activated if one of said edges is imperfect;

removing means mounted along said feed path opposite said inlet aperture, said removing means being operatively connected to said switch such that said removing means shifts said tube out of the feed path and into the inlet aperture of the auxiliary container in response to said switch being activated.

* * * * *

UNITED STATES PATENT AND TRADEMARK OFFICE
CERTIFICATE OF CORRECTION

PATENT NO.   : 4,927,029
DATED        : May 22, 1990
INVENTOR(S)  : Jiri TRHLIK

It is certified that error appears in the above-identified patent and that said Letters Patent is hereby corrected as shown below:

Cover page, item [75], line 1, delete "Jiri THRLIK, Fzechoslovakian," and substitute therefor --Jiri TRHLIK, Usti nad Orlici,--.

Signed and Sealed this

Thirteenth Day of August, 1991

Attest:

HARRY F. MANBECK, JR.

*Attesting Officer*   *Commissioner of Patents and Trademarks*